United States Patent [19]
Howanski et al.

[11] Patent Number: 5,868,528
[45] Date of Patent: *Feb. 9, 1999

[54] CLEAN AIR BULK MATERIAL HANDLING METHOD AND SYSTEM

[75] Inventors: John W. Howanski, Windham; Clifford B. Richardson, Mont Vernon, both of N.H.

[73] Assignee: Hendrix Wire & Cable, Inc., Milford, N.H.

[*] Notice: The term of this patent shall not extend beyond the expiration date of Pat. No. 5,639,188.

[21] Appl. No.: 831,090

[22] Filed: Apr. 1, 1997

Related U.S. Application Data

[63] Continuation of Ser. No. 662,074, Jun. 12, 1996, Pat. No. 5,639,188, which is a continuation-in-part of Ser. No. 274,285, Jul. 13, 1994, abandoned.

[51] Int. Cl.$^6$ .................................................. B65G 53/26
[52] U.S. Cl. ........................................... 406/151; 454/228
[58] Field of Search .................................. 406/38, 39, 41, 406/121, 151, 152, 153; 454/187, 228, 236

[56] References Cited

U.S. PATENT DOCUMENTS

| | | | |
|---|---|---|---|
| 4,668,131 | 5/1987 | Hart, Sr. et al. | 406/23 |
| 4,884,923 | 12/1989 | Wellink | 406/41 |
| 4,993,883 | 2/1991 | Jones | 406/39 |
| 5,035,543 | 7/1991 | Medemblik et al. | 406/39 |
| 5,199,826 | 4/1993 | Lawrence | 406/41 |
| 5,331,991 | 7/1994 | Nilsson | 135/93 |
| 5,639,188 | 6/1997 | Howanski et al. | 406/151 |

OTHER PUBLICATIONS

"Polyethylene Handling and Storage Guide," Union Carbide Corp., 1984.

*Primary Examiner*—Andrew C. Pike
*Attorney, Agent, or Firm*—Rudnick & Wolfe

[57] ABSTRACT

In order to decrease or eliminate environmental contaminants from fluent particulate matter that is removed from bulk material carriers by conventional vacuum conveyor systems, the bulk material carrier is moved into an enclosure which can be closed off from the environment after the carrier is within the enclosure. Clean air containing a prescribed maximum number of particles above a given size floods the entire enclosure and air of even greater cleanliness is fed to a selected discharge valve of the material carrier to entrain the particulate matter in the clean air streams which pass through the bulk material under the influence of the vacuum conveyor.

18 Claims, 4 Drawing Sheets

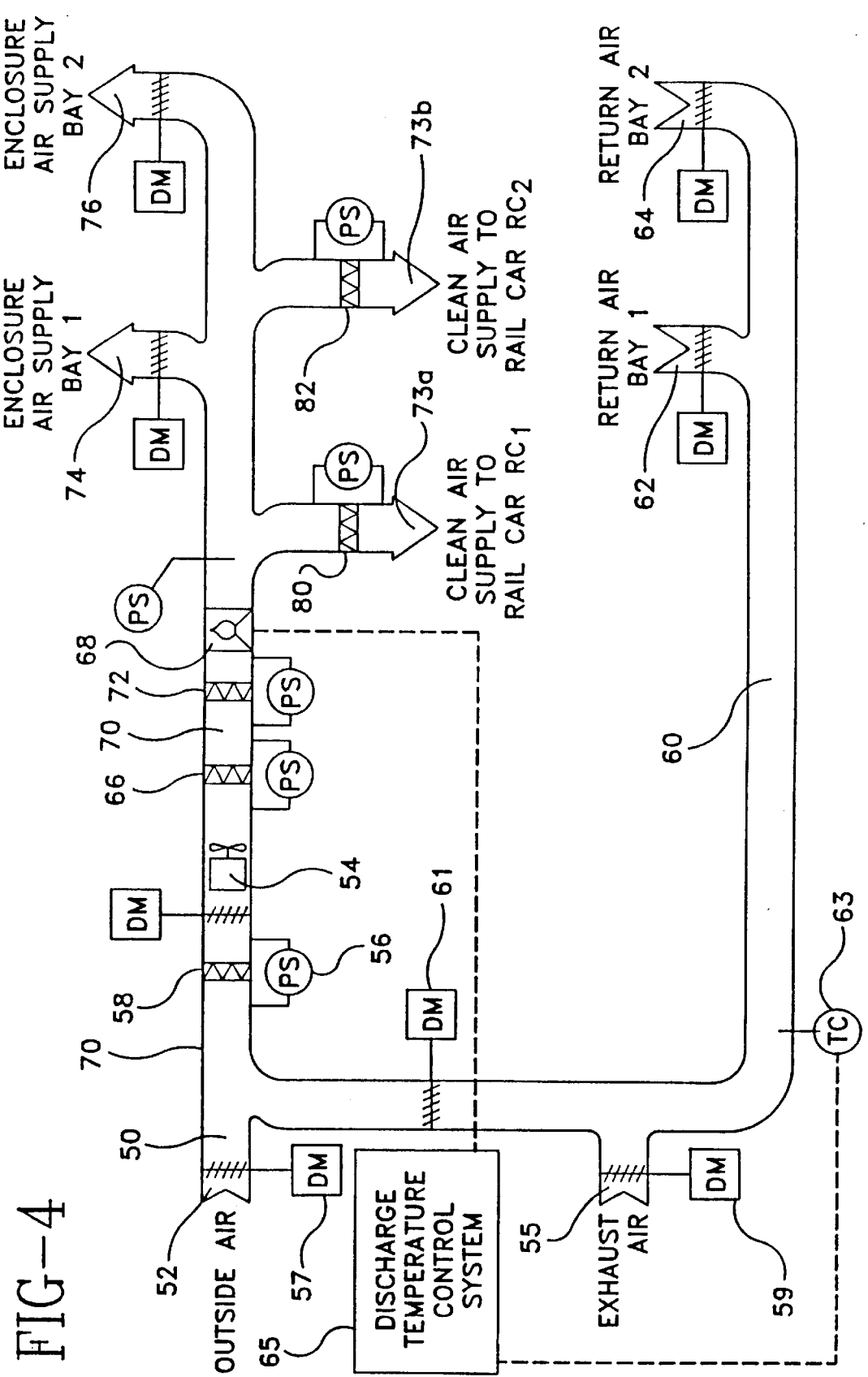

CLEAN AIR BULK MATERIAL HANDLING METHOD AND SYSTEM

This is a continuation of U.S. patent application Ser. No. 08/662,074, filed Jun. 12, 1996, now patented as U.S. Pat. No. 5,639,188, which is a continuation-in-part of U.S. patent application Ser. No. 08/274,285, filed Jul. 13, 1994, now abandoned.

BACKGROUND OF THE INVENTION

1. Field of the Invention

The invention is directed to the movement of granular or fluent particulate matter from a shipping container to a point of use and more particularly to a clean air, vacuum operated bulk material handling system.

2. Description of the Prior Art

At present when it is desired to use a vacuum system to unload a rail car or tank truck containing granular materials such as grain, corn kernels, beans, plastic pellets, or fluent particulate matter such as molding powders, carbon or lamp black, or coloring agents, the loading and discharge hatches of the rail car are opened to the surrounding environment and air is drawn into the rail car to entrain the granules or particles in the moving air stream. Unfortunately, since the rail car or tank truck is exposed to ambient environment, and often in a very industrial area, the air and grounds about the rail car or tank truck are highly contaminated and these containments can be drawn into the air stream as well as the granules and particulate matter and carried to the using station. These containments could alter the properties of the products being made at the using station. For example, if rubber is being molded, such contaminants could alter the physical or electrical properties of the resultant molded rubber product which could lead to its failure in the field.

SUMMARY OF THE INVENTION

The instant invention seeks to overcome the deficiencies noted with respect to the prior art by providing a clean air bulk material handling system which substantially reduces the introduction of foreign matter and contaminants into the air stream used for carrying granular or particulate matter that is being unloaded from bulk carriers such as rail cars and tank trucks. This is accomplished by providing an enclosure for the bulk carrier which is extremely clean and which substantially reduces the contaminants entering such enclosure. The enclosure is supplied with air which has been filtered and heated and which is also extremely clean. Thus when the entraining of the granules or particles with the ambient air occurs, substantially no containments are added to the granules or particulate matter. It is an object of the instant invention to provide an improved bulk handling system for granular or particulate matter.

It is another object of the instant invention to provide an improved vacuum operated bulk handling system for granular or particulate matter.

It is another object of the instant invention to provide an improved bulk handling system for granular or particulate matter which prevents or minimizes the introduction of foreign or contaminant matter from outside of the system.

It is yet another object of the instant invention to provide an improved vacuum operated bulk handling system for granular or particulate matter which prevents or minimizes the introduction of foreign or contaminant matter from outside of the system.

It is still another object of the instant invention to provide an improved vacuum operated bulk handling system for granular or particulate matter which employs a contaminant-free enclosure for the bulk material carrying device and a clean air supply for entraining the granules and particulate matter in the system air stream.

Other objects and features of the invention will be pointed out in the following description and claims and illustrated in the accompanying drawings, which disclose, by way of example, the principles of the invention, and the best mode which is presently contemplated for carrying it out.

BRIEF DESCRIPTION OF THE DRAWINGS

In the drawings in which similar elements are given similar reference characters:

FIG. 4 is a schematic representation of the duct work of FIGS. 1 to 3 to show the manner of supplying required air and removing spent air.

DESCRIPTION OF THE PREFERRED EMBODIMENT

Figure 1:
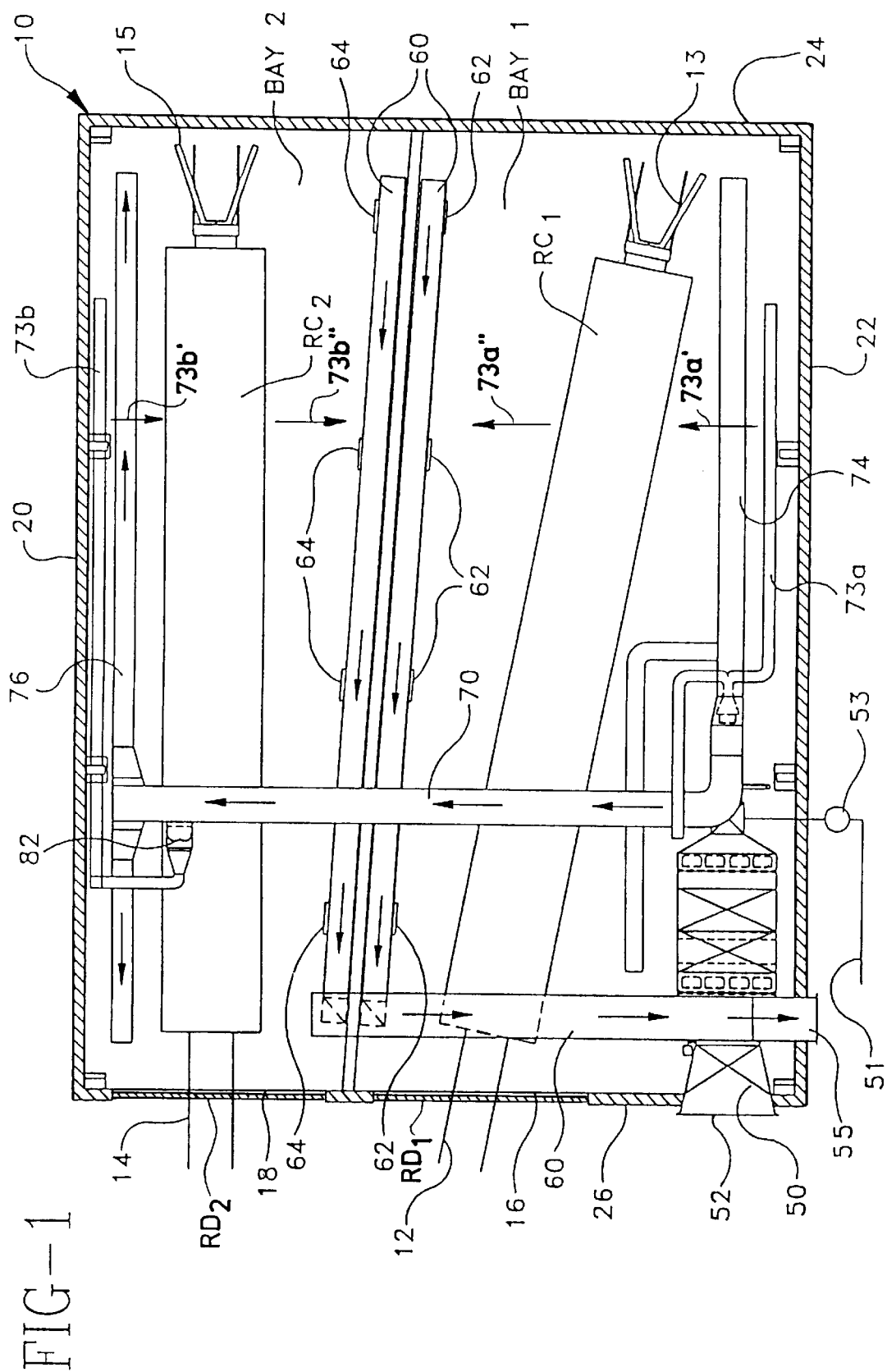
FIG. 1 is a top elevational view of a building constructed to facilitate practice of the method of the instant invention with the roof removed to reveal the details of the structures within.
Figure 2:
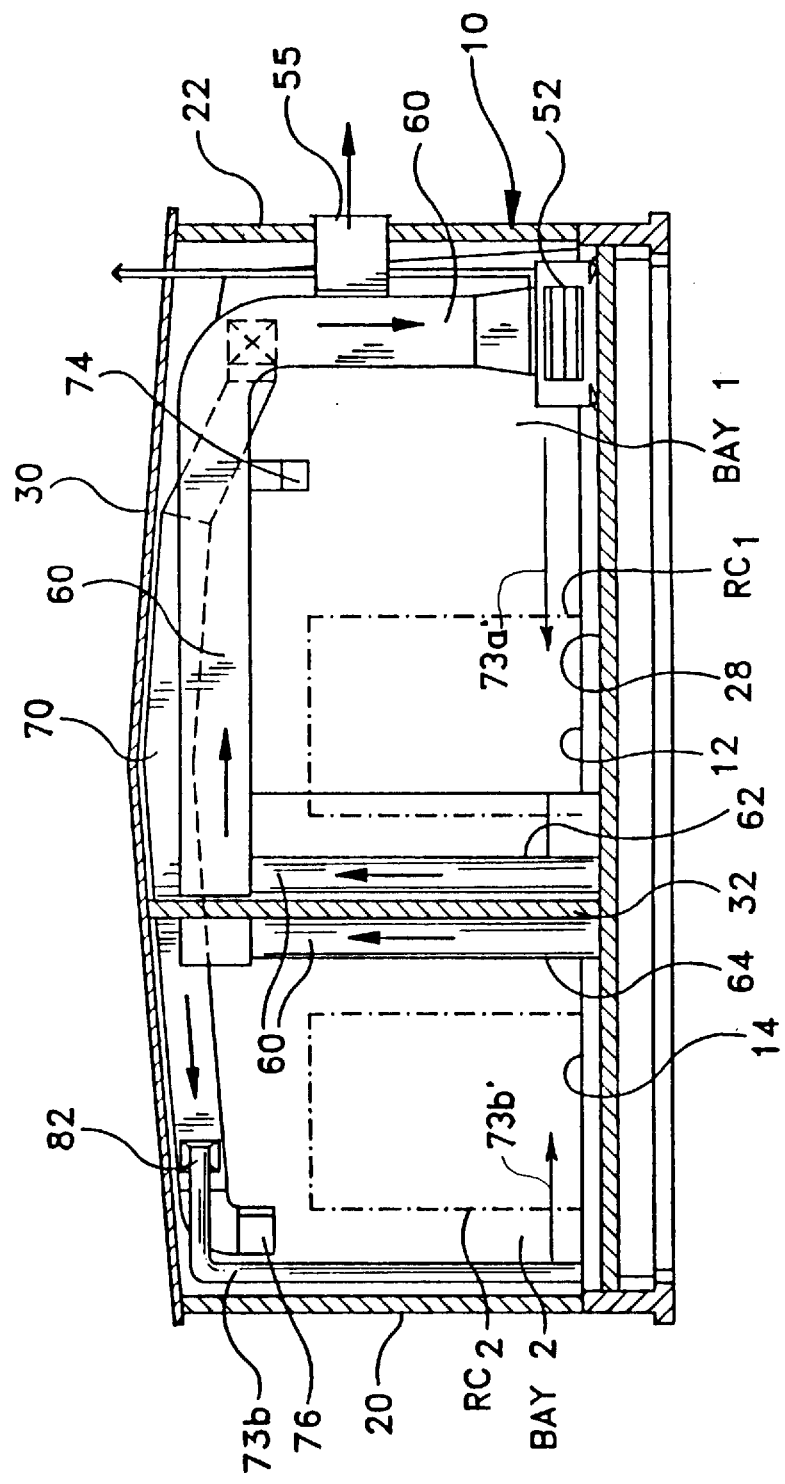
FIG. 2 is a left end elevational view of the building of FIG. 1 with the walls and doors thereof removed to reveal the details of the structures within.
Figure 3:
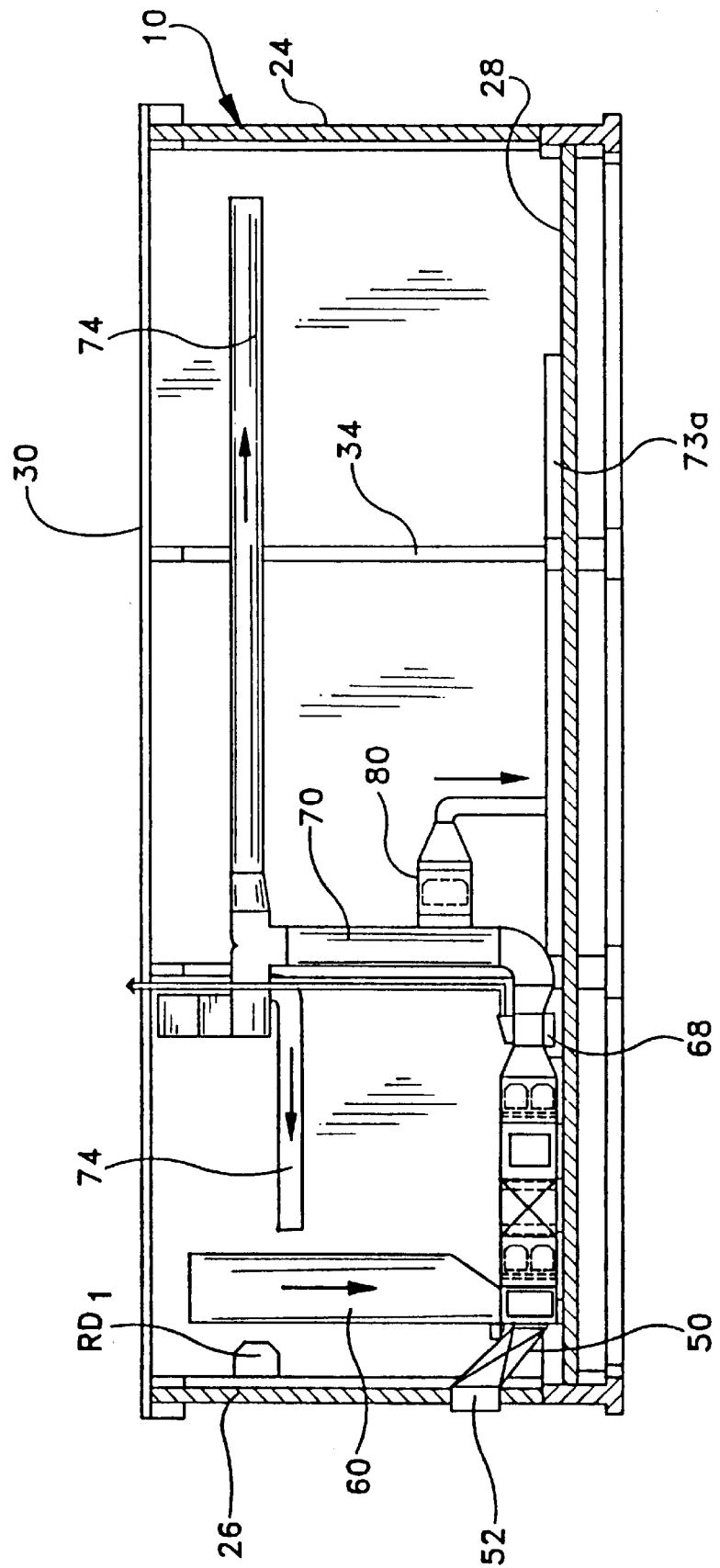
FIG. 3 is a front elevational view of the building of FIG. 1 with the wall removed to reveal the details of the structures within.

Turning to FIGS. 1 to 3, there is shown a building or enclosure 10 which can be used to enclose two railway cars $RC_1$ and $RC_2$ which contain granular or fluent particulate matter to be off-loaded by a conventional vacuum conveyor system (not shown). To simplify the description, the term fluent matter will be used herein to refer to both granular and fluent particulate matter. It should be understood that although the description herein is made with reference to rail cars, the invention is equally applicable to tank trucks or other vehicles used to carry fluent matter and the building or enclosure employed would be a garage with similar features but without the rails, or a building or enclosure which can handle both rail cars and tank trucks.

Building 10 is divided into two bays with a set of tracks 12 extending from a main track line (not shown) into Bay 1 to permit railway car $RC_1$ to be moved fully within enclosure 10 up to the end barrier or bumper 13. A second set of tracks 14 extending from the same main track line permits a second railway car $RC_2$ to be moved fully into Bay 2 of the enclosure 10, if desired, up to the barrier or bumper 15. As shown in FIG. 1A, a set of roll-up doors $RD_1$ and $RD_2$ can now be moved from their open positions to close entrance 16 to Bay 1 and entrance 18 to Bay 2. If desired to remove any environmental contaminants from the outside of the railway cars $RC_1$, $RC_2$, a car washing system (not shown) similar to a car wash could be employed before the railway cars $RC_1$ and $RC_2$ are moved into enclosure 10 or while in enclosure 10.

Building 10 has two substantially parallel side walls 20 and 22, and two substantially parallel end walls 24 and 26. End wall 26 has, as stated above, two entrances 16 and 18 which are fitted with roll-up doors to close entrances 16 and 18. The floor 28 is raised as shown in FIGS. 2 and 3 but could also be placed directly upon the ground. Tracks 12 and 14 are contained in floor 28. Two roof support columns 32, 34 extend from floor 28 to the roof 30. Although roof 30 is shown as a centrally peaked roof, it could also be flat or inclined from one end to the other dependent upon local weather conditions.

Turning to FIG. 4 the concept of the instant invention can be described. As stated above, the concept broadly stated is to provide fluent matter, which has substantially no on site environmental contaminants, from a bulk material carrier to a conventional vacuum conveyor system. In accordance with the invention, the bulk carrier is moved entirely into an enclosure which is then sealed with respect to the environment about the enclosure. Clean outside air from which substantially all of the environmental contaminants have been removed is provided to fill the bays of the enclosure about the carrier, or carriers, and still cleaner air, from which substantially all of any remaining environmental contaminants present in the clean air in the enclosure are removed, is provided to the carrier interior to provide a clean air stream to entrain the fluent matter and permit the fluent matter to be drawn into the conventional vacuum conveyor.

Fresh outside air is drawn into the system at the entrance 52 to duct 50 by a blower 54. The fresh outside air is combined with the recirculated return air in duct 60 from register 62 in Bay 1 and register 64 in Bay 2. The combined fresh outside air and return air is passed through a medium efficiency filter 58 to duct 70. By controlling the amount of return air in duct 60, such as by motorized dampers 59 and 61, and the fresh air in duct 50, such as by motorized damper 57, it is possible to produce the desired clean air flow within the enclosure 10. Additional motorized dampers DM may be provided, as shown in FIG. 4. This clean air flow may be in the order of 10,000 cubic feet per minute for an enclosure of the size of enclosure 10. The clean air flow can be increased or decreased for the specific enclosure or the material being handled, or the carrier, among other things.

The air from filter 58 in duct 70 is passed through a second medium efficiency filter 66, and then through a high efficiency particulate air (HEPA) filter 72, and then through a gas burner and heat exchanger section 68. Each filter may be provided with a pressure sensor PS, such as pressure sensor 56 for filter 58, as indicated in FIG. 4. The air is then provided to the bay air supply ducts 74 and 76 for Bay 1 and Bay 2, respectively, via duct 70. This air is class 10,000 air. Federal Standard 209 D is the accepted method for measuring the degree of cleanliness and requires an actual count of the cumulative total number of particles of a particular size (diameter) or larger per unit volume of air. For the 10,000 class air, the air sample contains a maximum of 10,000 particles of 0.5 microns (0.0000005 meters) or larger, where 0.5 microns is the customary representative size. The clean air is also discharged at a temperature of 65° to 95° F. at a pressure of 2.50" WC, as automatically controlled by the discharge temperature control system 65 in conjunction with thermocouple TC, as identified by reference character 63.

The clean air from duct 70 also is supplied to the discharge valves of the railway cars via ducts 73a and 73b to entrain the granular or fluent particulate matter in the clean air for subsequent removal by the conventional vacuum conveyor system. The clean air supplied to ducts 73a and 73b, however, is first passed through HEPA filters 80 and 82 for additional filtration. The clean air supplied by filters 80 and 82 therefore is class 100 air, which means that an air sample contains a maximum of 100 particles of 0.5 microns or larger. In the system described, the particle size preferably has been reduced to 0.3 microns rather than the standard 0.5 microns particle diameter permitted by the Federal Standard.

Returning now to FIGS. 1, 2, and 3, the physical structure for collecting and distributing the air is shown. Fresh air enters entrance 52 of duct 50 and is advanced along duct 50 to where the recirculated return air duct 60 joins duct 50. The combined air is passed through duct 70 and the filters 58, 66 and 72 and on to the gas burner and heat exchanger 68 to raise the air temperature to a minimum 65° F. The gas required for the gas burner is supplied via gas line 51 through regulator 53. Part of the clean air which exits duct 70 is directed to duct 74 along the top of wall 22 which provides the air supply for Bay 1. Another portion of the clean air from duct 70 goes to duct 76 adjacent the top of wall 20 to provide the air supply for Bay 2.

The remainder of the clean air in duct 70 is divided between the two additional ducts 73a and 73b, which extend down along the floor 28 of Bay 1 adjacent tracks 12 and along the floor 28 of Bay 2 adjacent tracks 14, respectively, as shown in FIGS. 1–3. In passing from duct 70 to each of the further ducts 73a and 73b, the air goes through HEPA filters 80 and 82, respectively. The clean air in duct 73a is released to the discharge valves of railway car $RC_1$ through a number of vent ports, as schematically shown by arrow 73a' in FIG. 1. Similarly, the clean air in duct 73b is released to the discharge valves of railway car $RC_2$ through a number of vent ports, as schematically shown by arrow 73b' in FIG. 1. The vent ports in use should be aligned and in communication with discharge valves available in each railway car, and those not used may be suitably closed to maintain, for example, 1.0" WC of pressure in the system.

Clean air from the vent and supplied to the discharge valves of the railroad cars thereby entrains the fluent particulant matter in the discharge valves for removal from the railroad cars by the conventional vacuum conveyor system, as shown schematically by arrows 73a" and 73b" in FIG. 1. The clean air not employed in the air stream of the vacuum conveyor is removed by the ducts 60 near the floor 28 of enclosure 10 through registers 64 in Bay 2 and 62 in Bay 1 to be used as recirculated return air as above described. Excess air is exhausted via vent 55 in side wall 22 and building 10 is maintained at 0.1" WC.

While there have been shown and described and pointed out the fundamental novel features of the invention as applied to the preferred embodiment, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows.

What is claimed is:

1. A handling method for minimizing environmental contamination of bulk quantities of fluent materials off-loaded from a bulk material carrier employing a vacuum system, the handling method comprising the steps of:
    a) placing the bulk material carrier containing the fluent materials in an enclosure;
    b) supplying clean air to an interior of said enclosure; and
    c) drawing the fluent materials from said bulk material carrier in a stream of the clean air, using the vacuum system, through a discharge valve of said bulk material carrier.

2. The method of claim 1, further comprising the step of sealing said enclosure to an environment surrounding the enclosure after said bulk material carrier has been placed in said enclosure.

3. The method of claim 1, wherein the supplying step includes the steps of:
    a) obtaining fresh air from an environment surrounding the enclosure, and b) filtering said fresh air to remove environmental contaminants therefrom.

4. The method of claim 3, wherein the supplying step further includes the step of heating the filtered air to within a predetermined range of temperatures.

5. The method of claim 1, further comprising the step of providing the clean air to the discharge valve of the bulk material carrier, the fluent materials being drawn in the clean air provided to the discharge valve.

6. The method of claim 5, wherein the providing step includes the step of filtering a portion of the clean air supplied to the enclosure to remove additional environmental contaminants therefrom prior to providing the clean air to the discharge valve.

7. A handling method for minimizing environmental contamination of bulk quantities of fluent materials off-loaded from a bulk material carrier employing a vacuum system, the handling method comprising the steps of:
 a) placing the bulk material carrier containing the fluent materials in an enclosure;
 b) supplying clean air to an interior of said enclosure;
 c) providing the clean air to a discharge valve of the bulk material carrier in said enclosure; and
 d) drawing the fluent materials from said bulk material carrier in a stream of the clean air provided to the discharge valve, using the vacuum system, through the discharge valve of said bulk material carrier.

8. The method of claim 7, further comprising the step of sealing said enclosure to an environment surrounding the enclosure after said bulk material carrier has been placed in said enclosure.

9. The method of claim 7, wherein the supplying step includes the steps of:
 a) obtaining fresh air from an environment surrounding the enclosure; and
 b) filtering said fresh air to remove environmental contaminants therefrom.

10. The method of claim 9, wherein the supplying step further includes the step of heating the filtered air to within a predetermined range of temperatures.

11. The method of claim 7, wherein the providing step includes the step of filtering a portion of the clean air supplied to the enclosure to remove additional environmental contaminants therefrom prior to providing the clean air to the discharge valve.

12. A handling system for minimizing environmental contamination of bulk quantities of fluent materials off-loaded from a bulk material carrier employing a vacuum system, the handling system comprising:
 a) an enclosure to receive the bulk material carrier containing the fluent materials;
 b) a supply of clean air in communication with an interior of said enclosure to supply the clean air thereto; and
 c) an assembly to draw the fluent materials from the bulk material carrier in a stream of the clean air from the supply, using said vacuum system, through a discharge valve of said bulk material carrier.

13. The system of claim 12, wherein said enclosure is a structure surrounding the bulk material carrier, the structure including at least one door which can be opened to admit the bulk material carrier and closed after the bulk material carrier is placed therein to seal said enclosure from a surrounding environment.

14. The system of claim 12, wherein said supply of clean air includes:
 a) a duct through which fresh air can be obtained from an environment outside of said enclosure; and
 b) a filter, coupled to said duct, to remove environmental contaminants from said fresh air.

15. The system of claim 14, further comprising:
 a heater to heat the fresh air to within a predetermined range of temperature.

16. The system of claim 14, wherein the filter includes a first filter element and a second filter element having an efficiency higher than the first filter element.

17. The system of claim 12, wherein the assembly includes a vent port to provide the clean air from the supply to the discharge valve of the bulk material carrier placed in said enclosure, the vacuum system drawing the stream from the clean air provided by the assembly, with the fluent materials entrained therein, through the discharge valve.

18. The system of claim 17, wherein the assembly further includes a secondary filter to remove additional environmental contaminants from the clean air before providing the clean air to the discharge valve of the bulk material carrier placed in said enclosure.

* * * * *